United States Patent [19]

Fujii

[11] 4,188,091
[45] Feb. 12, 1980

[54] CATA-DIOPTRIC OBJECTIVE LENS SYSTEM

[75] Inventor: Toru Fujii, Hino, Japan

[73] Assignee: Olympus Optical Co., Ltd., Tokyo, Japan

[21] Appl. No.: 895,806

[22] Filed: Apr. 12, 1978

[30] Foreign Application Priority Data

Apr. 22, 1977 [JP] Japan .................................. 52-46463

[51] Int. Cl.$^2$ ........................................... G02B 17/08
[52] U.S. Cl. ............................................... 350/201
[58] Field of Search ........................ 350/201, 202, 199

[56] References Cited

U.S. PATENT DOCUMENTS

| | | | |
|---|---|---|---|
| 3,632,190 | 1/1972 | Shimizu | 350/201 |
| 3,926,505 | 12/1975 | Rayces | 350/201 |

Primary Examiner—Paul A. Sacher

Attorney, Agent, or Firm—Cushman, Darby & Cushman

[57] ABSTRACT

A compact cata-dioptric objective lens system comprising a first, second, third and fourth lens components in which the first lens component is a positive meniscus lens, the second lens component has a primary mirror formed on its surface on the image side by leaving a transparent central portion, the third lens component has a secondary mirror formed on its surface on the object side and the fourth lens component is cemented to the second lens component. The cata-dioptric objective lens system is arranged so that the rays entered through the first lens component are reflected by the primary and secondary mirrors, pass through the transparent central portion of the second lens component and are imaged thereafter and so that the fourth lens component has a large thickness in order to eliminate detrimental rays.

5 Claims, 4 Drawing Figures

CATA-DIOPTRIC OBJECTIVE LENS SYSTEM

BACKGROUND OF THE INVENTION (a) Field of the invention

The present invention relates to a cata-dioptric objective lens system and, more particularly, to a compact and light-weight cata-dioptric objective lens system.

(b) Description of the prior art

As cata-dioptric telephoto objective lens systems have an annular aperture, it is necessary in most cases to provide an opening at the central portion of the first reflecting surface, i.e., the primary mirror. The opening of the primary mirror should be worked so that eccentricity will not be caused between the center of the opening and optical axis of the primary mirror and that the accuracy of the reflecting surface will not decrease and it is very difficult to work the opening satisfactorily. As a cata-dioptric objective lens system in which the primary mirror is not provided with an opening, the cata-dioptric telephoto objective lens system according to U.S. Pat. No. 3,632,190 is known. However, in case of the lens system according to U.S. Pat. No. 3,632,190 undesirable ghosts will be caused by the rays which pass through the central portion of the primary mirror on which the first reflecting surface is formed and, therefore, it is necessary to provide a cylinder for preventing the detrimental rays in the lens system and to thereby prevent the detrimental rays from passing through the central portion of the primary mirror. But, it is considerably difficult to fix such cylinder in position. Besides, to compactly arrange the lens system as a whole, it is effective to some extent when the first reflecting surface is arranged to have a strong converging effect and the second reflecting surface is arranged to have a strong diverging effect. However, it is unavoidable to place the second reflecting surface at a position about $\frac{1}{2}$ of the total optical path length (the optical path length from the front surface of the first lens component to the film surface along the optical path) of the lens system. To make the overall length of the lens system short, it is therefore necessary to make the converging effect of the first reflecting surface extremely strong. In that case, however, coma will be aggravated considerably.

SUMMARY OF THE INVENTION

It is, therefore, a primary object of the present invention to provide a compact cata-dioptric objective lens system with simple lens configuration in which a concave surface having a strong diverging effect is arranged at a position on the image side of a second reflecting surface and a thick lens component having the above-mentioned concave surface is cemented to a lens component having a first reflecting surface so that a circumferential surface of the thick lens component serves as a cylinder for preventing the aforementioned detrimental rays.

The cata-dioptric objective lens system according to the present invention has lens configuration as shown in FIG. 1 or FIG. 2 and comprises a first, second, third and fourth lens components in the order according to the advancing direction of rays, said first lens component $L_1$ being a positive meniscus lens arranged convex toward the object side, said second lens component $L_2$ being arranged concave toward the object side and having a concave primary mirror formed on its surface on the image side by leaving a transparent central portion, said third lens component $L_3$ being arranged near said first lens component $L_1$ in an independent state or split state and having a secondary mirror formed on its surface on the object side, said fourth lens component $L_4$ being a negative cemented doublet or negative single lens having a large thickness and being cemented to said second lens component $L_2$, said cata-dioptric objective lens system being arranged so that the rays which enter the lens system finally go out through the transparent portion of the second lens component $L_2$. Besides, the cata-dioptric objective lens system according to the present invention satisfies the following conditions:

(1) $1.0f \leq f_1 \leq 2.5f$ (2) $0.05f \leq |r_7| \leq 0.2f$ (3) $0.05f \leq D_4 + D_2 \leq 0.1f$ wherein reference symbol $f_1$ represents the focal length of the first lens component $L_1$, reference symbol $r_7$ represents the radius of curvature of the surface on the object side of the fourth lens components $L_4$, reference symbol $D_2$ represents the thickness of the second lens component and reference symbol $D_4$ represents the thickness of the fourth lens component $L_4$. Now, meanings of the above conditions are described below.

For the purpose of arranging the lens system compactly, it is preferable to make the refractive power of the first lens component $L_1$ strong because it is then possible to make the telephoto ratio small and to make the overall length of the lens system short. When, however, $f_1$ becomes smaller than the lower limit of the condition (1), the height of paraxial rays reflected by the primary mirror becomes too small and, therefore, the difference between the height of paraxial rays reflected by the primary mirror and height of the transparent central portion of the second lens component $L_2$ becomes extremely small. As a result, the F number of the cata-dioptric objective lens system becomes large, i.e., the aperture ratio becomes small. On the contrary, when $f_1$ becomes larger than the upper limit of the condition (1), negative coma to be caused by the first lens component $L_1$ will be reduced and this is desirable. However, it becomes difficult to arrange the overall lens system compactly. That is, to arrange the overall lens system compactly, it becomes unavoidable to make the power of the primary mirror strong. In that case, however, spherical aberration and coma to be caused by the primary mirror will increase and, therefore, it inevitably becomes impossible to make the overall lens system compact.

The surface $r_7$ on the object side of the fourth lens component $L_4$ is to diverge, together with the secondary mirror, the rays which are converged by the first lens component $L_1$ and primary mirror. If the rays are diverged only by the secondary mirror without using the diverging surface $r_7$, the height of paraxial rays which pass through the transparent central portion of the second lens component becomes large and, therefore, the height of offaxial upper rays also becomes large. Consequently, the width of the annular reflecting surface of the second lens component $L_2$ becomes small. Besides, the secondary mirror should be placed at a position about $\frac{1}{2}$ of the total optical path length of the lens system. Therefore, if it is attempted to make the overall lens system compact by diverging the rays by the secondary mirror only, it becomes unavoidable to make the power of the primary mirror or first lens component $L_1$ strong and, consequently, disadvantages described in relation to the condition (1) will be caused. If the radius of curvature $r_7$ becomes smaller than the lower limit of the condition (2), the diverging effect of the surface $r_7$ becomes too strong and, consequently, flare due to coma of offaxial rays, especially of offaxial upper rays, will increase. If, on the contrary, the radius of curvature $r_7$ becomes larger than the upper limit of the condition (2), the diverging effect of the surface $r_7$ becomes weak and, therefore, it is impossible to arrange the overall lens system compactly. Moreover, the fact to limit the radius of curvature $r_7$ within the range defined by the condition (2) is effective also for the purpose of keeping Petzval's sum of the overall lens system at a preferable adequate value.

The thickness $D_4+D_2$ from the converging surface $r_7$ of the fourth lens component $L_4$ to the surface $r_4$ on the image side of the second lens component $L_2$ along the optical axis has influence on elimination of detrimental rays which cause ghosts, which are undesirable for the cata-dioptric objective lens system. By cementing the thick lens component $L_4$ having the diverging surface $r_7$ to the second lens component $L_2$, it is possible to eliminate the rays, which directly enter the transparent central portion of the second lens component $L_2$ after passing through the first lens component $L_1$, by means of the thick lens component $L_4$. That is, by applying black paint to the circumferential surface of the thick lens component $L_4$ or by other suitable methods, it is possible to prevent such detrimental rays. If $D_4+D_2$ becomes smaller than the lower limit of the condition (3), a part of rays passed through the first lens component $L_1$ will directly reach the film surface passing through the surface $r_7$ and will cause ghosts. If $D_4+D_2$ becomes larger than the upper limit of the condition (3), the height of paraxial rays which enter the surface $r_7$ becomes large and, therefore, the rays at the inner portion of the annular flux reflected by the primary mirror will be eclipsed by the surface $r_7$. As a result, the F number becomes large and, moreover, the weight of the lens system as a whole becomes large.

DETAILED DESCRIPTION OF THE PREFERRED EMBODIMENTS

Preferred embodiments of the cata-dioptric objective lens system according to the present invention explained in the above are as shown below.

Embodiment 1

| $f = 100$, | $2\omega = 5°$, | F/8 |
|---|---|---|
| $r_1 = 51.642$ | | |
| $d_1 = 2.201$ | $n_1 = 1.72$ | $\nu_1 = 46.03$ |
| $r_2 = 86.371$ | | |
| $d_2 = 13.209$ | | |
| $r_3 = -32.376$ | | |
| $d_3 = 1.761$ | $n_2 = 1.56384$ | $\nu_2 = 60.69$ |
| $r_4 = -48.693$ | | |
| $d_3 = -1.761$ | $n_2 = 1.56384$ | $\nu_2 = 60.69$ |
| $r_3 = -32.376$ | | |
| $d_2 = -13.209$ | | |
| $r_2 = 86.371$ | | |
| $d_1 = -2.201$ | $n_1 = 1.72$ | $\nu_1 = 46.03$ |
| $r_1 = 51.642$ | | |
| $d_4 = -0.4$ | | |
| $r_5 = -23.181$ | | |
| $d_5 = -0.781$ | $n_3 = 1.56444$ | $\nu_3 = 43.78$ |
| $r_6 = -29.039$ | | |
| $d_5 = 0.781$ | $n_3 = 1.56444$ | $\nu_3 = 43.78$ |
| $r_5 = -23.181$ | | |
| $d_4 = 0.4$ | | |
| $r_1 = 51.642$ | | |
| $d_1 = 2.201$ | $n_1 = 1.72$ | $\nu_1 = 46.03$ |
| $r_2 = 86.371$ | | |
| $d_7 = 9.006$ | | |
| $r_7 = -10.258$ | | |
| $d_8 = 0.3$ | $n_4 = 1.713$ | $\nu_4 = 53.89$ |
| $r_8 = 803.637$ | (D4) | |
| $d_9 = 3.903$ | $n_5 = 1.64769$ | $\nu_5 = 33.8$ |
| $r_3 = -32.376$ | | |
| $d_3 = 1.761$ | (D2) $n_2 = 1.56384$ | $\nu_2 = 60.69$ |
| $r_4 = -48.693$ | | |
| $f_1 = 173.767$, | $D_4 + D_2 = 0.05964f$ | |

Embodiment 2

| $f = 100$, | $2\omega = 5°$, | F/7.4 |
|---|---|---|
| $r_1 = 33.247$ | | |
| $d_1 = 2$ | $n_1 = 1.51821$ | $\nu_1 = 65.04$ |
| $r_2 = 56.014$ | | |
| $d_2 = 13$ | | |
| $r_3 = -29.907$ | | |
| $d_3 = 1.8$ | $n_2 = 1.51633$ | $\nu_2 = 64.15$ |
| $r_4 = -46.175$ | | |
| $d_3 = -1.8$ | $n_2 = 1.51633$ | $\nu_2 = 64.15$ |
| $r_3 = -29.907$ | | |
| $d_4 = -12$ | | |
| $r_5 = -21.739$ | | |
| $d_5 = -1$ | $n_3 = 1.58215$ | $\nu_3 = 42.09$ |
| $r_2 = 56.014$ | | |
| $d_1 = -2$ | $n_1 = 1.51821$ | $\nu_1 = 65.04$ |
| $r_1 = 33.247$ | | |
| $d_6 = -0.6$ | $n_4 = 1.58904$ | $\nu_4 = 53.33$ |
| $r_6 = -26.574$ | | |
| $d_6 = 0.6$ | $n_4 = 1.58904$ | $\nu_4 = 53.33$ |
| $r_1 = 33.247$ | | |
| $d_1 = 2$ | $n_1 = 1.51821$ | $\nu_1 = 65.04$ |
| $r_2 = 56.014$ | | |
| $d_5 = 1$ | $n_3 = 1.58215$ | $\nu_3 = 42.09$ |
| $r_5 = -21.739$ | | |
| $d_7 = 8$ | | |
| $r_7 = -9.746$ | | |
| $d_8 = 4$ | (D4) $n_5 = 1.6516$ | $\nu_5 = 58.67$ |
| $r_3 = -29.907$ | | |
| $d_3 = 1.8$ | (D2) $n_2 = 1.51633$ | $\nu_2 = 64.15$ |
| $r_4 = -46.175$ | | |
| $f_1 = 153.255$, | $D_4 + D_2 = 0.058f$ | |

Figure 1:
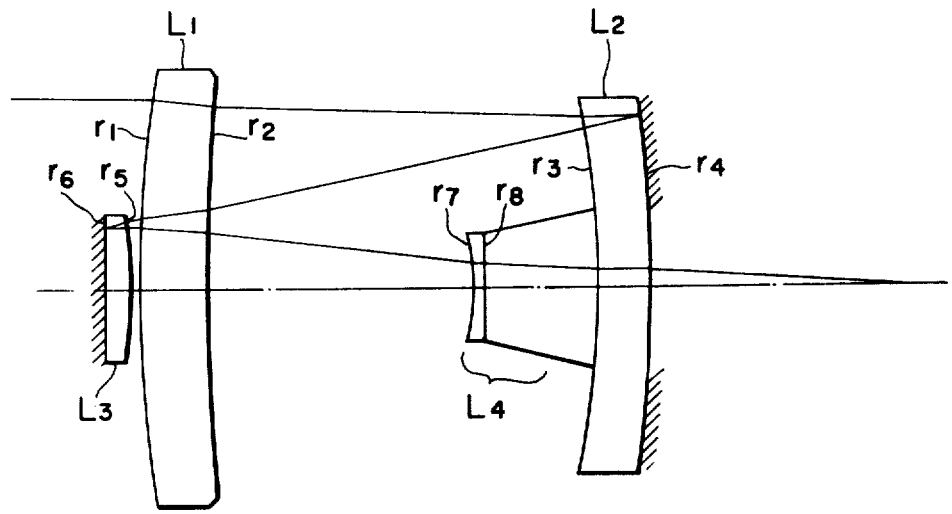
FIG. 1 shows a sectional view of Embodiment 1 of the catadioptric objective lens system according to the present invention.
Figure 2:
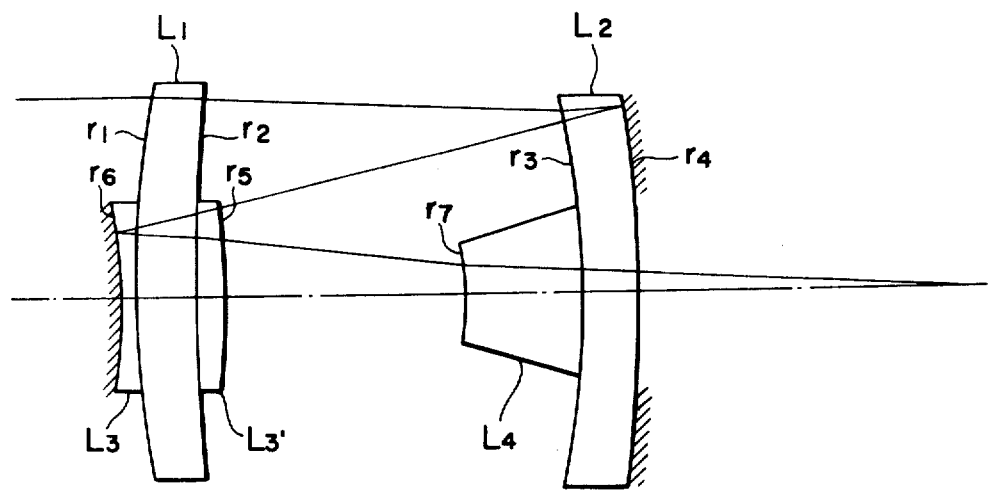
FIG. 2 shows a sectional view of Embodiment 2.
Figure 3:
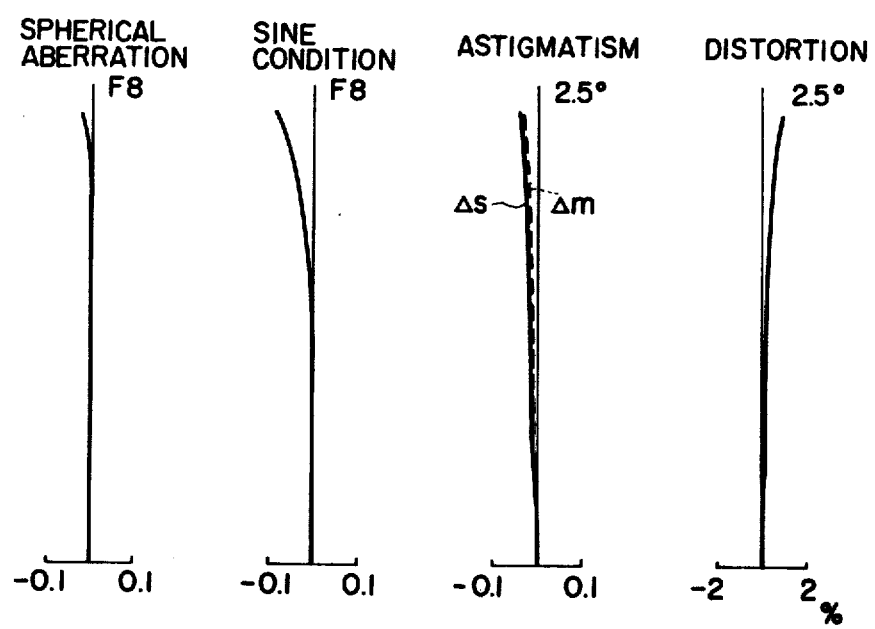
FIG. 3 shows graph illustrating aberration curves of Embodiment 1.
Figure 4:
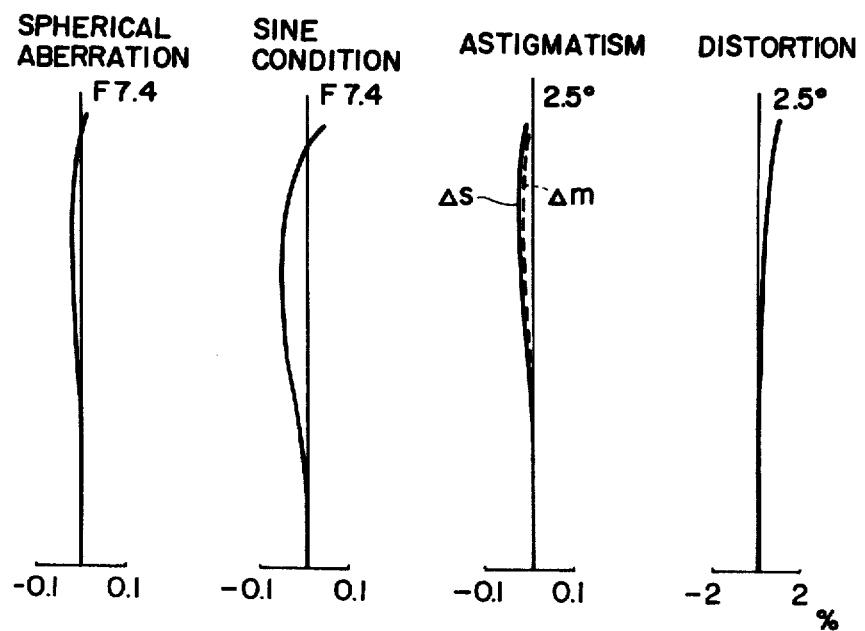
FIG. 4 shows graphs illustrating aberration curves of Embodiment 2.

In the above embodiments, reference symbols $r_1$, $r_2$, . . . respectively represent radii of curvature of respective surfaces, reference symbols $d_1 d_2$, . . . respectively represent thicknesses of respective lenses and airspaces between respective lenses (these are shown as positive values in case that the rays advance in the direction from the object side toward the image side and as negative values in case that the rays advance in the opposite direction), reference symbols $n_1$, $n_2$, . . . respectively represent refractive indices of respective lenses and reference symbols $\nu_1$, $\nu_2$, . . . respectively represent Abbe's numbers of respective lenses. Out of the above embodiments, Embodiment 1 has lens configuration as shown in FIG. 1 in which the third lens component $L_3$ is arranged on the object side of the first lens component $L_1$ and the fourth lens component $L_4$ is arranged as a cemented doublet. Embodiment 2 has lens configuration as shown in FIG. 2 in which the third lens component is divided into two lenses, i.e., the lens $L_3$ and lens $L_3'$, which are cemented to and arranged on both sides of the first lens component $L_1$ while the fourth lens component $L_4$ is arranged as a single lens.

In both of these embodiments, the reflecting surface of the third lens component is arranged on the object side of the first lens component $L_1$. This is effective for compactly arranging the lens system as a whole.

I claim:

1. A cata-dioptric objective lens system comprising a first, second, third and fourth lens components, said first lens component being a positive meniscus lens arranged convex toward the object side, said second lens component being arranged concave toward the object side and having a concave primary mirror formed on its surface on the image side by leaving a transparent central portion, said third lens component being arranged near said first lens component and having a secondary mirror formed on its surface on the object side, said fourth lens component being a negative lens component having a large thickness and being cemented to said second lens component, said cata-dioptric objective lens system being arranged so that the rays entered through said first lens component are reflected by said primary mirror and secondary mirror, go out through said transparent central portion of said second lens component and are imaged thereafter, said cata-dioptric objective lens system satisfying the following conditions:

(1) $1.0f \leq f_1 \leq 2.5f$
(2) $0.05f \leq |r_7| \leq 0.2f$
(3) $0.05f \leq D_4 + D_2 \leq 0.1f$ wherein reference symbol $f_1$ represents the focal length of the first lens component, reference symbol $r_7$ represents the radius of curvature of the surface on the object side of the fourth lens component, reference symbol $D_2$ represents the thickness of the second lens component, and reference symbol $D_4$ represents the thickness of the fourth lens component.

2. A cata-dioptric objective lens system according to claim 1, in which said third lens component is arranged on the object side of said first lens component and said fourth lens component is arranged as a cemented doublet.

3. A cata-dioptric objective lens system according to claim 2, in which said cata-dioptric objective lens system has the following numerical data:

| $f = 100$, $2\omega = 5°$, F/8 | | | |
| --- | --- | --- | --- |
| $r_1 = 51.642$ | | | |
| $d_1 = 2.201$ | $n_1 = 1.72$ | $\nu_1 = 46.03$ | |
| $r_2 = 86.371$ | | | |
| $d_2 = 13.209$ | | | |
| $r_3 = -32.376$ | | | |
| $d_3 = 1.761$ | $n_2 = 1.56384$ | $\nu_2 = 60.69$ | |
| $r_4 = -48.693$ | | | |
| $d_3 = -1.761$ | $n_2 = 1.56384$ | $\nu_2 = 60.69$ | |
| $r_3 = -32.376$ | | | |
| $d_2 = -13.209$ | | | |
| $r_2 = 86.371$ | | | |
| $d_1 = -2.201$ | $n_1 = 1.72$ | $\nu_1 = 46.03$ | |
| $r_1 = 51.642$ | | | |
| $d_4 = -0.4$ | | | |
| $r_5 = -23.181$ | | | |
| $d_5 = -0.781$ | $n_3 = 1.56444$ | $\nu_3 = 43.78$ | |
| $r_6 = -29.039$ | | | |
| $d_5 = 0.781$ | $n_3 = 1.56444$ | $\nu_3 = 43.78$ | | wherein reference symbols, $r_1, r_2, \ldots$ respectively represent radii of curvature of respective surfaces, reference symbols $d_1, d_2, \ldots$ respectively represent thicknesses of respective lenses and airspaces between respective lenses (these are shown as positive values in case that the rays advance in the direction from the object side toward the image side and as negative values in case that the rays advance in the opposite direction), reference symbols $n_1, n_2, \ldots$ respectively represent refractive indices of respective lenses, reference symbols $\nu_1, \nu_2, \ldots$ respectively represent Abbe's numbers of respective lenses, reference symbol $f$ represents the focal length of the lens system as a whole, reference symbol $f_1$ represents the focal length of the first lens component, reference symbol $D_2$ represents the thickness of the second lens component, and reference symbol $D_4$ represents the thickness of the fourth lens component.

4. A cata-dioptric objective lens system according to claim 1, in which said third lens component is divided into two lens elements arranged on both sides of said first lens component and cemented to respective surfaces of said first lens component, one of said two lens elements arranged on the object side of said first lens component having an secondary mirror formed on its surface on the object side, and in which said fourth lens component is arranged as a negative single lens.

5. A cata-dioptric objective lens system according to claim 4, in which said cata-dioptric objective lens system has the following numerical data:

| $f = 100$, $2\omega = 5°$, F/7.4 | | | |
| --- | --- | --- | --- |
| $r_1 = 33.247$ | | | |
| $d_1 = 2$ | $n_1 = 1.51821$ | $\nu_1 = 65.04$ | |
| $r_2 = 56.014$ | | | |
| $d_2 = 13$ | | | |
| $r_3 = -29.907$ | | | |
| $d_3 = 1.8$ | $n_2 = 1.51633$ | $\nu_2 = 64.15$ | |
| $r_4 = -46.175$ | | | |
| $d_3 = -1.8$ | $n_2 = 1.51633$ | $\nu_2 = 64.15$ | |
| $r_3 = -29.907$ | | | |
| $d_4 = -12$ | | | |
| $r_5 = -21.739$ | | | |
| $d_5 = -1$ | $n_3 = 1.58215$ | $\nu_3 = 42.09$ | |
| $r_2 = 56.014$ | | | |
| $d_1 = -2$ | $n_1 = 1.51821$ | $\nu_1 = 65.04$ | |
| $r_1 = 33.247$ | | | |
| $d_6 = -0.6$ | $n_4 = 1.58904$ | $\nu_4 = 53.33$ | |
| $r_6 = -26.574$ | | | |
| $d_6 = 0.6$ | $n_4 = 1.58904$ | $\nu_4 = 53.33$ | |
| $r_1 = 33.247$ | | | |
| $d_1 = 2$ | $n_1 = 1.51821$ | $\nu_1 = 65.04$ | |
| $r_2 = 56.014$ | | | |
| $d_5 = 1$ | $n_3 = 1.58215$ | $\nu_3 = 42.09$ | |
| $r_5 = -21.739$ | | | |
| $d_7 = 8$ | | | |
| $r_7 = -9.746$ | | | |
| $d_8 = 4$ ($D_4$) | $n_5 = 1.6516$ | $\nu_5 = 58.67$ | |
| $r_3 = -29.907$ | | | |
| $d_3 = 1.8$ ($D_2$) | $n_2 = 1.51633$ | $\nu_2 = 64.15$ | |
| $r_4 = -46.175$ | | | |
| $f_1 = 153.255$, $D_4 + D_2 = 0.058f$ | | | | wherein reference symbols $r_1, r_2, \ldots$ respectively represent radii of curvature of respective surfaces, reference symbols $d_1 d_2, \ldots$ respectively represent thicknesses of respective lenses and airspaces between respective lenses (these are shown as positive values in case that the rays advance in the direction from the object side toward the image side and as negative values in case that the rays advance in the opposite direction), reference symbols $n_1, n_2 \ldots$ respectively represent refractive indices of respective lenses, reference symbols $\nu_1, \nu_2, \ldots$ respectively represent Abbe's numbers of respective lenses, reference symbol $f$ represents the focal length of the lens system as a whole, reference symbol $f_1$ represents the focal length of the first lens component, reference symbol $D_2$ represents the thickness of the second lens component, and reference symbol $D_4$ represents the thickness of the fourth lens component.

* * * * *